Dec. 4, 1956  N. H. KENT ET AL  2,772,856
STRUCTURAL ELEMENTS FOR TURBO-MACHINES SUCH AS COMPRESSORS
OR TURBINES OF GAS-TURBINE ENGINES
Filed July 3, 1953

INVENTORS
N. H. KENT &
C. ARMER
BY:-
Wilkinson & Mawhinney
ATTYS.

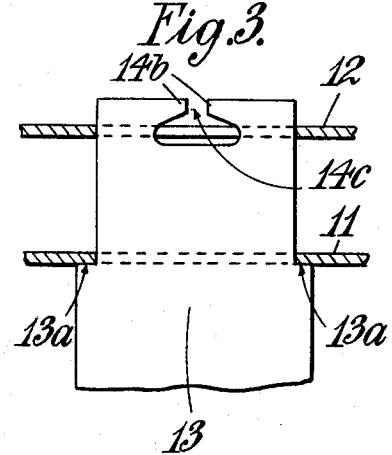
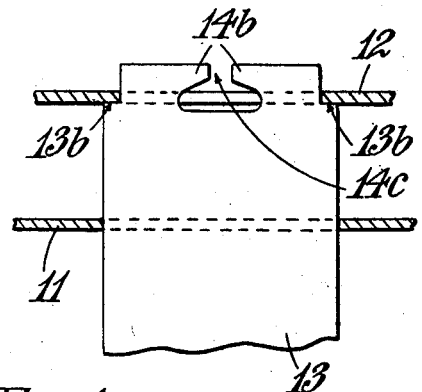
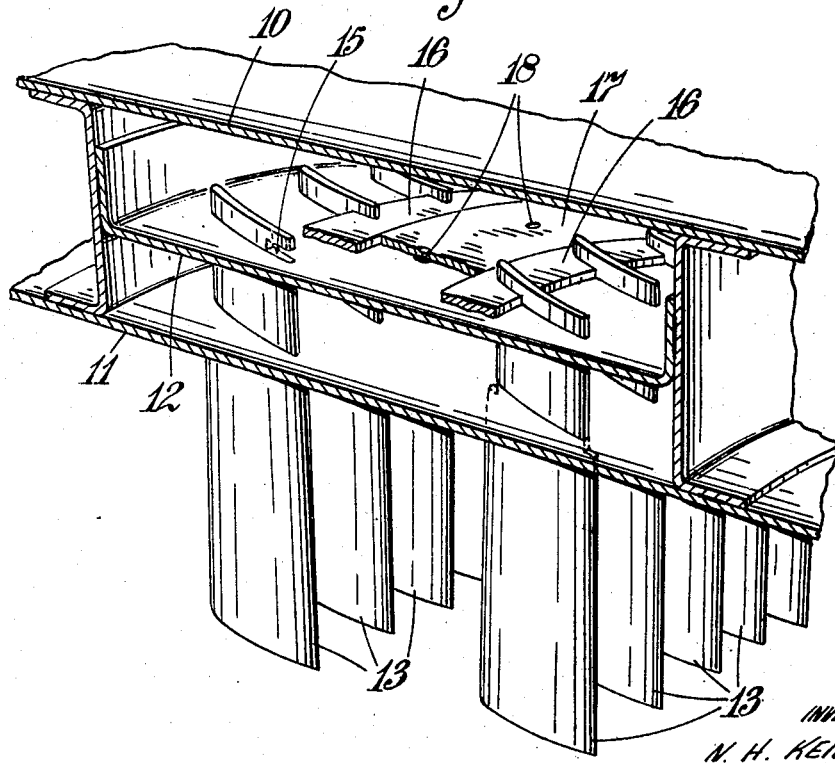

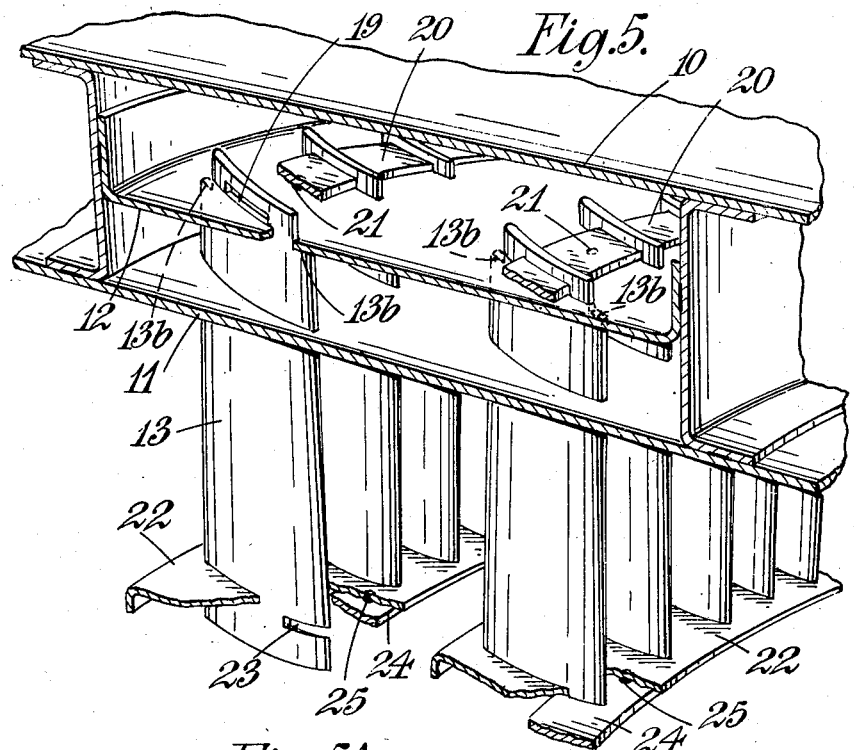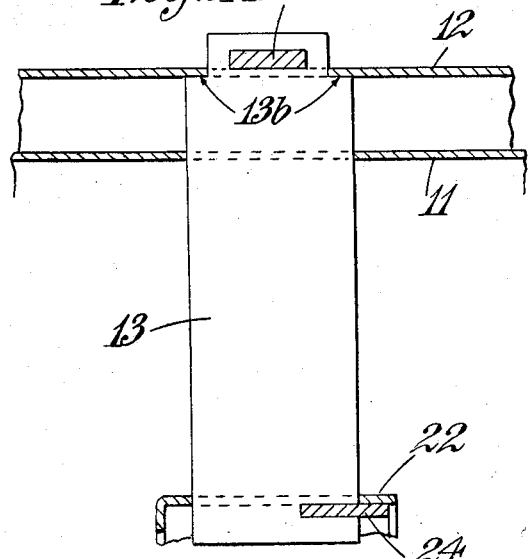

United States Patent Office 2,772,856
Patented Dec. 4, 1956

2,772,856

STRUCTURAL ELEMENTS FOR TURBO-MACHINES SUCH AS COMPRESSORS OR TURBINES OF GAS-TURBINE ENGINES

Nelson Hector Kent, Allestree, and Cyril Armer, Chellaston, near Derby, England, assignors to Rolls-Royce Limited, Derby, England, a British company Application July 3, 1953, Serial No. 366,021

Claims priority, application Great Britain July 11, 1952

10 Claims. (Cl. 253—78)

This invention relates to structural elements for turbo-machines such as compressors or turbines of gas-turbine engines.

The invention has for an object to provide structural elements for use in the construction of turbo-machines such as compressors and turbines of gas turbine engines which are simple in form and which can be readily and inexpensively manufactured.

Some preferred embodiments of the invention are illustrated in the accompanying drawing in which—

Figure 1:
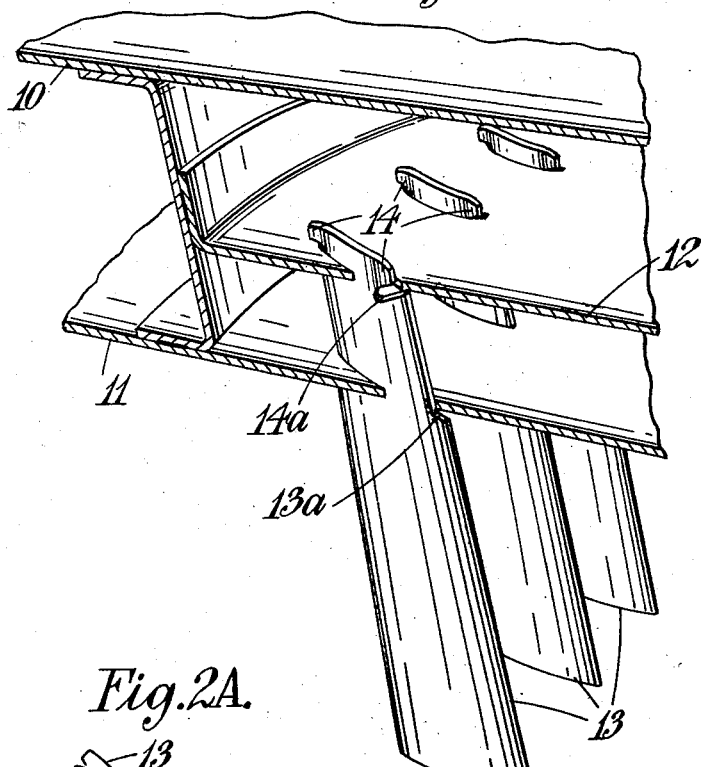
Figure 2A:
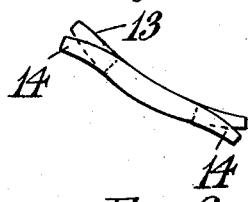
Figure 2:
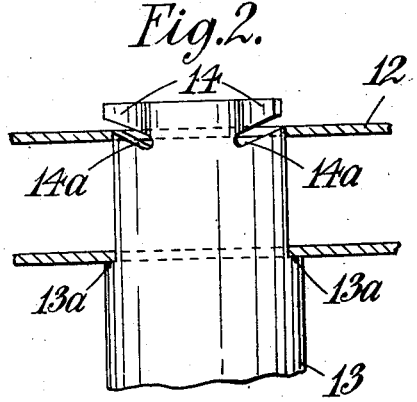
Figure 2B:
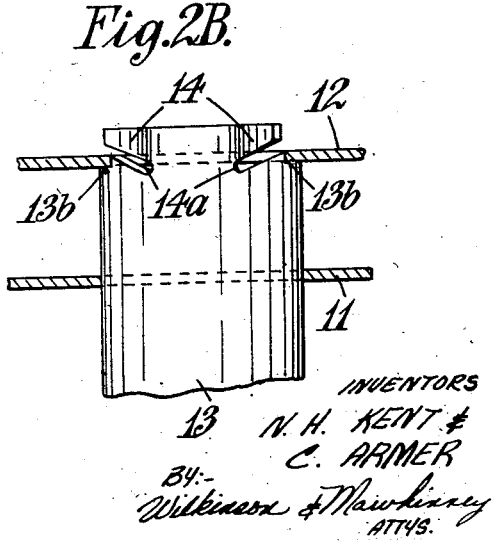

Figure 1 shows diagrammatically the construction of a stator blade assembly of a stage of an axial-flow compressor, Figures 2 and 2A show an end of a blade of the construction of Figure 1 illustrating the method of retention by deformation of tangs formed thereon, Figure 2B shows a modification of the arrangement of Figures 1, 2 and 2A, Figure 3 shows an alternative form of blade, Figure 3A shows a simple modification of the arrangement of Figure 3, Figure 4 shows an arrangement in which a separate member is used for locking the blade elements, Figure 5 shows another arrangement in which a separate member is employed for locking the blade elements, and Figure 5A shows in detail one blade element of the arrangement of Figure 5.

Referring to Figures 1, 2 and 2A, the wall 10 constitutes the main structural member of the stator structure of an axial-flow compressor and extends from the inlet end to the delivery end of the compressor. The outer wall of the annular compressor channel is defined by a circumferentially-extending sheet-metal skin 11, and an additional circumferentially-extending skin 12 is located coaxially with and between wall 10 and skin 11. The skins 11 and 12 are either fully annular parts of a shroud-and-mounting structure for stator blade elements 13, or are part-annular so that a number of the structural elements are required to form a complete annulus.

The blade elements are conveniently cut in lengths from strip or bar material having the desired aerofoil cross-section. In certain cases the profile and incidence of sections of the blade may be varied by deformation of the strip, e. g. by twisting and/or bending to increase or decrease the camber as desired.

Skins 11 and 12 are formed with slots in radially aligned pairs and, as will best be seen from Figure 2, the end of each blade element 13 where it is engaged in these slots is cut away adjacent its leading and trailing edges, the slots having a correspondingly reduced length compared with the full chord of the blade section. In this manner abutment shoulders 13a are provided on the blade element 13 to bear against the skin 11 adjacent the ends of the slots therein to limit the extent of radial projection of the blade elements 13 through the slots.

As will be seen more clearly in Figures 2 and 2A, each blade element is provided at its outer end with outwardly and oppositely-directed tangs 14, which, after the end of the blade element has been threaded through its slots, are bent out from the general contour of the blade element 13, as shown in Figure 2A, to abut the skin 12 around the slot therein and to retain the blade element 13 in position in the slots. The tangs are formed by cutting inclined slots 14a in the blade element 13 and thus, on deformation of the tangs 14, the lower edges of the tangs 14 engage the outer surface of the skin 12, and by virtue of their inclination cause the shoulder 13a of the blade element to be drawn tightly into abutment with the skin 11. Moreover, the width and inclination of the slots 14a is such that the full width of the end of a blade element is available within the slot in skin 12. The deformation may be carried out by means of a bending tool having suitably shaped gripping jaws.

Referring now to Figure 2B, there is shown a similar arrangement. In this case, however, the end of the blade element 13 is cut away at its leading and trailing edges only over that portion which projects through the skin 12 so providing shoulders 13b which abut the skin 12, instead of the skin 11.

An arrangement which is somewhat similar to the arrangement of Figures 1, 2, 2A is shown in Figure 3, but in this case the deformable tangs 14b are formed to project towards one another by cutting the blade away at its mid section for instance as indicated at 14c. With this arrangement the full width of the end of a blade element is available in a slot in the skin 12 irrespective of the shape of the cut-away for forming the tangs.

A corresponding arrangement with shoulders 13b in abutment with the skin 12 is shown in Figure 3A.

In the arrangements of Figures 1, 2, 2A, 2B, 3 and 3A, the tangs 14, 14a are deformed towards the convex surface so that the concave face of the blade element is forced into contact with the corresponding edge of its slot in the skin 12. This ensures that the blading element is in its proper location especially if the slot is made somewhat oversize to facilitate assembly.

In Figure 4, like numerals are employed to refer to parts which have corresponding parts in Figures 1, 2, 2A and 3. In this construction, the blade elements 13 have in their edges elongated notches 15 to receive a strip-like locking member 16 which extends circumferentially of the stator blade assembly. Two adjacent stages of stator blading 13 are shown each having a locking member 16. A spacer strip 17 is provided to retain locking members 16 in engagement with the notches 15 in the blade elements 13, the spacer strip 17 being tack-welded as at 18 to the skin 12. The locking member 16 provides an indirect abutment on the skin 12 for a plurality of blade elements. To facilitate assembly a number of locking members may be used for each ring of blade elements.

Referring now to Figures 5 and 5A, the blade elements 13 are provided with closed slots 19 to receive a locking member 20 in the form of a segmental strip. When the locking member is in position, each of its associated blade elements is held with shoulders 13b in abutment with one surface of the skin 12 and has an indirect abutment on the other surface of the skin through the locking member 20. The locking members 20 may be tack welded in position as indicated at 21.

The radially inner ends of the blade elements 13 carry flanged sheet-metal members 22 which in use will act to provide seals with adjacent rotor structure (not shown). The blade elements 13 extend through slots in the members 22 and are formed with notches 23 to receive retaining strips 24 which are tack welded in position against the member 22 as indicated at 25.

In yet another arrangement (not illustrated) the portions of the ends of the blade elements 13 projecting through the skin 12 are drilled with holes through which a wire is passed circumferentially of the assembly, said wire being located with respect to the skin 12 to form an abutment to retain the blade elements in position. Abutment means will also be provided to limit the extent to which the blade elements project into the shroud structure.

We claim:

1. A structural element for a turbo-machine having a working fluid passage, comprising a first circumferentially-extending sheet-metal skin to afford a section of the wall of said working fluid passage, a second circumferentially-extending sheet-metal skin secured coaxially with the first skin and spaced therefrom on the side thereof remote from said working fluid passage, each of said skins being formed with circumferentially-spaced slots, each slot in one skin being aligned with a corresponding slot in the other skin, and a plurality of aerofoil-section blade elements of a blade row of the turbo-machine supported by said spaced skins to extend cantileverwise across said working fluid passage, each blade element having an end portion engaged in an aligned pair of said slots, the end portion having cut-aways at its leading and trailing edges to provide abutment shoulders facing in the direction of the lengthwise axis of the blade element towards the second skin, said shoulders being at a position lengthwise of the blade element to be in abutment with one of said skins, and each blade element having at least one slot in that part of the end portion which projects through the slot in the second skin to form a pair of oppositely-directed tangs, each tang having a surface which is inclined to the lengthwise axis of the blade element and faces towards said shoulders, and each tang extending laterally from the general contour of the blade element with its inclined surface bearing on the surface of said second skin remote from the working fluid passage, whereby said shoulders are drawn into abutment with said one of the skins.

2. A structural element as claimed in claim 1 wherein said shoulders are at a position lengthwise of the blade element to be in abutment with the surface of said first skin nearer the working fluid passage.

3. A structural element as claimed in claim 1 wherein said shoulders are at a position lengthwise of the blade element to be in abutment with the surface of said second skin nearer the working fluid passage.

4. A structural element as claimed in claim 1, wherein the part of the end portion which passes through the slot in the second skin, has two tang-forming slots, each of the slots being inclined to the lengthwise axis of the blade element, and the inclined slots extending respectively away from the leading and trailing edges of the end portion towards said first skin, the walls of the inclined slots on the side thereof remote from the shoulders affording said inclined surfaces of the pair of oppositely-directed tangs.

5. A structural element as claimed in claim 4 wherein said shoulders are at a position lengthwise of the blade element to be in abutment with the surface of said first skin nearer the working fluid passage.

6. A structural element as claimed in claim 4 wherein said shoulders are at a position lengthwise of the blade element to be in abutment with the surface of said second skin nearer the working fluid passage.

7. A structural element as claimed in claim 1, wherein the end portion has said tang-forming slot at its mid-section extending from a mouth in the end edge of the blade element towards said first skin, said slot having sides which diverge in a direction away from the mouth and afford said inclined surfaces of the pair of oppositely-directed tangs.

8. A structural element as claimed in claim 7 wherein said shoulders are at a position lengthwise of the blade element to be in abutment with the surface of said first skin nearer the working fluid passage.

9. A structural element as claimed in claim 7 wherein said shoulders are at a position lengthwise of the blade element to be in abutment with the surface of said second skin nearer the working fluid passage.

10. A structural element for a turbo-machine having a working fluid passage, comprising a first circumferentially-extending sheet-metal skin to afford a section of the wall of said working fluid passage, a second circumferentially-extending sheet-metal skin secured coaxially with the first skin and spaced therefrom on the side thereof remote from said working fluid passage, each of said skins being formed with circumferentially-spaced slots, each slot in one skin being aligned with a corresponding slot in the other skin, and a plurality of aerofoil-section blade elements of a blade row of the turbo-machine supported by said spaced skins to extend cantileverwise across said working fluid passage, each blade element having an end portion engaged in an aligned pair of said slots, the end portion having cut-aways at its leading and trailing edges to provide abutment shoulders facing in the direction of the lengthwise axis of the blade element towards the second skin, said shoulders being at a position lengthwise of the blade element to be in abutment with one of said skins, and each blade element having at least one slot in that part of the end portion which projects through the slot in the second skin to form a pair of oppositely-directed tangs, each tang having a surface which faces towards said shoulders, and each tang extending laterally from the general contour of the blade element with said surface bearing on the surface of said second skin remote from the working fluid passage, whereby said shoulders are drawn into abutment with said one of the skins.

References Cited in the file of this patent

UNITED STATES PATENTS

| | | |
|---|---|---|
| 768,597 | Geisenhoner | Aug. 30, 1904 |
| 1,213,930 | Metten | Jan. 30, 1917 |
| 2,658,719 | Johanson | Nov. 10, 1953 |

FOREIGN PATENTS

| | | |
|---|---|---|
| 225,221 | Switzerland | Apr. 16, 1943 |